Sept. 5, 1961  D. DIPERSTEIN  2,998,645
METHOD OF REPAIRING CRACKED OR BROKEN METAL PARTS
Filed May 18, 1960
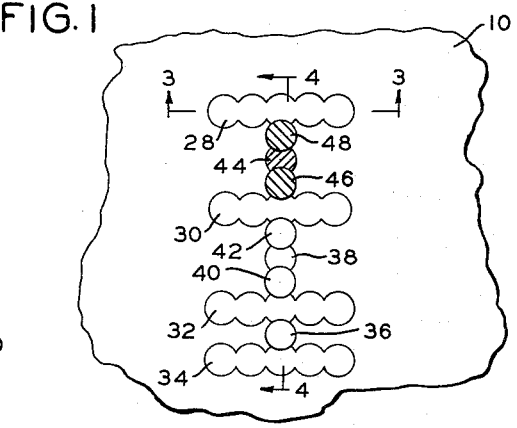
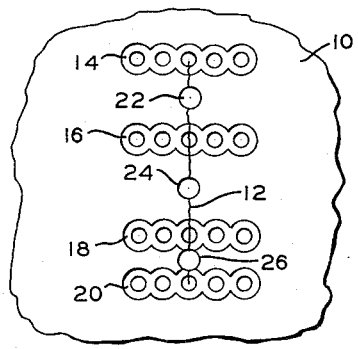
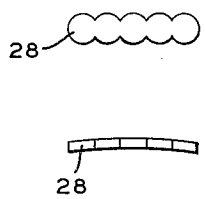
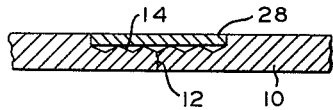
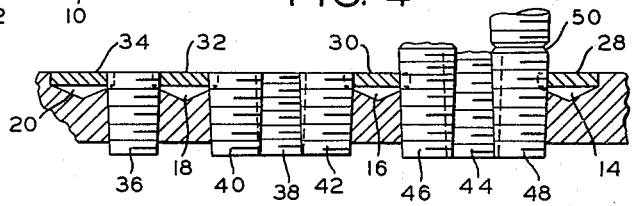
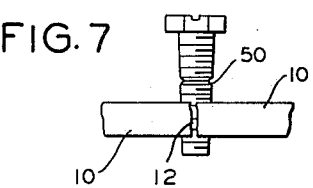
*INVENTOR.*
DAVID DIPERSTEIN
BY Arthur H. Seidel
ATTORNEY

United States Patent Office 2,998,645
Patented Sept. 5, 1961

2,998,645
METHOD OF REPAIRING CRACKED OR BROKEN METAL PARTS
David Diperstein, % United States Casting Repair Corp., 6432 Edmund St., Philadelphia, Pa.
Filed May 18, 1960, Ser. No. 29,904
5 Claims. (Cl. 29—402)

This invention relates to a method of repairing cracked or fractured metal parts, and more particularly to a method of repairing cracked or fractured metal parts by the use of fasteners commonly knows as "chain-locks," "metalocks," "seal-locks," etc. and without the application of heat.

The application of the present invention will enable a person to repair cracks in metal walls of automobile cylinder blocks, large pipes, valves, transmission housings, etc. without the use of external heat. The invention is specifically directed to a method of repairing cracks in metal walls by the use of fasteners commonly known as "chain-locks," "metalocks," "seal-locks," etc.

The use of "locks" for repairing cracks in metal walls has been known heretofore. The cracks in metal walls repaired by use of "locks," as used heretofore, suffer from several disadvantages. The locks used heretofore become loose and separate from the cracked wall when the repaired wall is subjected to continuous vibration. Any attempt to pre-stress the locks used heretofore resulted in unseating of the threaded plug from its tapped hole thereby permitting leakage.

It is an object of this invention to overcome the disadvantages of prior methods for repairing cracked or fractured metal parts.

It is another object of this invention to provide a method of repairing cracked or fractured metal parts without the use of heat by pre-stressing locks after the locks have been applied across a crack.

It is another object of the present invention to provide a method of repairing cracked or fractured metal parts by pre-stressing locks by use of tapered plugs or bolts.

It is another object of the present invention to provide a method of repairing cracked or fractured metal parts whereby the repaired area is stronger than an uncracked portion of the part.

It is another object of the present invention to provide a method of repairing cracked or fractured metal parts which is simple, efficient, and capable of being performed by unskilled labor.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a plan view of a partially repaired crack in a metal part.

FIGURE 2 is a plan view of a cracked metal part during an intermediate stage of repair according to the present invention.

FIGURE 3 is a cross-sectional view taken along the lines 3—3 in FIGURE 1.

FIGURE 4 is a cross-sectional view taken along the lines 4—4 in FIGURE 1.

FIGURE 5 is a plan view of a lock used in the method of the present invention.

FIGURE 6 is a side elevational view of the lock shown in FIGURE 5.

FIGURE 7 is a side elevational view of a cracked metal part with a tapered threaded bolt extending through the wall at the crack.

Referring to the drawings in detail, wherein like numerals indicate like elements, there is shown in FIGURE 1 a plan view of a cracked metal part 10 which is being repaired according to the present invention.

As shown in FIGURES 1 through 3, the metal part 10 has a crack 12 therein. A series of overlapping blind holes extending away from the crack is provided as shown at 14. The series of overlapping blind holes 14 are positioned at or adjacent to one end of the crack 12. At spaced points along the length of the crack 12, a series of overlapping blind holes 16 and 18 are provided. At the opposite end of the crack 12, a series of overlapping blind holes 20 are provided. Each of the series of overlapping blind holes 14, 16, 18, and 20 are preferably perpendicular to the direction of the crack 12.

A hole 22 is provided through the crack 12 at a point substantially equidistant from the series of overlapping blind holes 14 and 16. A hole 24, similar to hole 22, is provided through the crack 12 between the series of overlapping blind holes 16 and 18. A hole 26 is drilled through the crack 12 between the series of overlapping blind holes 18 and 20. As shown more clearly in FIGURE 2, the hole 26 overlaps a portion of each of the series of overlapping blind holes 18 and 20. Each of the holes 22, 24, and 26 are tapped with a tapered tap so as to provide a tapered thread in said holes 22, 24, and 26.

As seen more clearly in FIGURES 5 and 6, a lock 28 is provided having a contour substantially identical with the contour of the series of overlapping blind holes 14. The lock 28 is preferably arcuate in elevation as shown in FIGURE 6. Locks 30, 32, and 34 are substantially identical with lock 28. Tapered bolts 36 through 48 are identical with the tapered bolt shown in FIGURE 7.

The method of repairing cracked or fractured metal parts according to the present invention is as follows:

If a crack in a metal part 10 is relatively short, a series of spaced overlapping blind holes are provided at the extremities of the crack. For example, the series of overlapping blind holes may be the series of overlapping blind holes 18 and 20. Locks such as locks 32 and 34 are positioned within the series of overlapping blind holes 18 and 20. The locks 32 and 34 are then flattened by any convenient instrument such as an air hammer. The flattening of the locks 32 and 34 will make the uppermost surface of the locks 32 and 34 flush with the uppermost surface of the metal part.

Then a hole such as hole 26 will be provided through the crack and overlapping a portion of each of the locks 32 and 34. The hole 26 will then be tapped so as to provide a tapered thread therein. Then, a tapered bolt such as tapered bolt 36 will be threaded into the hole 26. As the tapered bolt 36 is threaded into the hole 26, the locks 32 and 34 will be pre-stressed thereby preventing the locks 32 and 34 from being capable of separating from the metal part 10 due to vibration of the metal part 10. The tapered bolt 36 will be turned by a torque wrench until the tapered bolt 36 snaps in shear along the groove 50, or the head and excess of the bolt may be sawed off or otherwise sheared. The tapered bolt 36 is made from high tension steel and is designed so as to snap in shear when a predetermined amount of pre-stressing has been applied to the locks 32 and 34.

Alternatively, instead of the threaded tapered bolt 36, a tapered plug may be substituted. In this event, the hole 26 will not be provided with a tapered thread.

After the locks 32 and 34 have been pre-stressed, the portion of the tapered bolt 36 or the tapered plug will be removed by any convenient manner such as grinding. The resultant structure will be as shown at the left-hand end of FIGURE 4 wherein the uppermost surface of the tapered bolt 36 and the locks 32 and 34 are flush with the uppermost surface of the metal wall 10.

If the crack to be repaired has an appreciable length, locks 28 and 32 would be positioned within a series of overlapping blind holes such as shown at 14 and 18 in FIGURE 2. In this case, the series of overlapping blind holes 14 and 18 would be positioned at the extremities of the crack. A lock 30 would be positioned within a series of overlapping blind holes 16 which is intermediate the locks 28 and 32. The locks 28, 30, and 32 would be fixedly secured within the series of overlapping blind holes 14, 16, and 18 in the manner described above. A hole 24 is drilled through the crack at a position between locks 30 and 32. Hole 24 is tapped with a tapered tap and is then filled with a tapered threaded bolt 38. The uppermost portion of the bolt 38 is then removed so as to be flush with the uppermost surface of the metal part 10.

A hole is provided through the crack between the lock 32 and the bolt 38. The hole is then threaded with a tapered thread and filled with a tapered threaded bolt 40. As seen more clearly in FIGURES 1 and 4, the bolt 40 is interlock with the lock 32 and the bolt 38. Then the uppermost portion of the bolt 40 is made flush with the uppermost surface of the metal part 10.

The length of the crack intermediate the locks 28 and 30 is provided with tapered bolts 44, 46, and 48 in the same manner as set forth above. For purposes of illustration, the uppermost portion of the bolts 44, 46, and 48 have not been removed. As a torque is applied to the head of the bolt 48, the bolt 48 will be threaded into a hole thereby interlocking bolt 44 and lock 28. After the bolt 48 has been threaded into the hole a predetermined distance, additional torque needed to thread the bolt 48 further into the hole will cause the bolt to shear at groove 50. This facilitates the removal of the uppermost portion of the tapered bolt 48 since only a relatively small portion of the bolt will be remaining for the grinding operation which makes the uppermost surface of the bolt 48 flush with the uppermost surface of the metal part 10.

Since the bolts 36 through 48 are tapered, the locks 28 through 34 will be pre-stressed as the bolts are threaded into tapered holes. Also, the provision of a tapered bolt provides for increased threaded area thereby providing an increased sealing area against leakage. As the locks 28 through 34 are being pre-stressed, the provision of tapered plugs enables the plugs to be tightened thereby overcoming any gap formed in the crack. Also, the tapered plugs effectively prevent the locks from becoming separated from the metal part 10. As shown more clearly in FIGURE 4, the greatest diameter of the tapered bolts 36 through 48 is in the plane of the uppermost surface of the metal part 10. Therefore, in order to remove the locks 28 through 34, it is first necessary to remove the tapered bolts 36, 40, 42, 46, and 48.

While the tapered plug 38 has been disclosed as being the first bolt to be inserted between the locks 30 and 32, it will be clear that tapered bolt 40 may be the first bolt to be threaded into the metal part 10. Thereafter, tapered bolt 38 would be provided and interlocked with the tapered bolt 40. Thereafter, tapered bolt 42 would be provided and interlocked with tapered bolt 38 and lock 30.

The locks may be spaced apart along the length of the crack by a distance slightly smaller than the diameter of a tapered bolt as shown in FIGURES 1 and 4 at 32 through 36. For a crack of any appreciable length, the locks are preferably spaced apart by a distance slightly smaller than the diameter of three overlapping bolts as shown in FIGURES 1 and 4 at 30, 32, 38, 40, and 42. Thus, the crack extending between adjacent locks may be provided with a single tapered bolt or a plurality of overlapping tapered bolts.

The present invention may be embodied in other specific forms without departing from the spirit or essential attributes thereof and, accordingly, reference should be made to the appended claims, rather than to the foregoing specification as indicating the scope of the invention.

I claim:

1. A method of repairing cracked or fractured metal parts comprising providing a series of overlapping blind holes extending away from a crack in a part at spaced points along said crack, fixedly securing a lock in each series of overlapping blind holes, providing a hole in said part between said locks so that said hole overlaps a portion of said locks and said crack between said locks, securing a tapered plug in said hole thereby pre-stressing said locks and filling the gap of said crack, and removing a portion of said plug which extends beyond the surface of said part.

2. A method of repairing cracked or fractured metal parts comprising providing a series of overlapping blind holes extending from a crack in a part at spaced points along said crack, fixedly securing a lock in each series of overlapping blind holes, providing a hole through said crack in a manner so that said hole overlaps a portion of said locks, tapping said hole with a tapered tap, threading a tapered bolt having a weakened portion intermediate its length in said hole thereby pre-stressing said locks, said step of threading said tapered bolt including the application of a turning torque to a head on said bolt until said bolt fails in shear at said weakened point, and removing any portion of said bolt extending beyond the surface of said part.

3. A method of repairing cracked or fractured metal parts comprising providing a first series of overlapping blind holes extending away from a crack in a wall, providing a second series of overlapping blind holes extending away from said crack at a point along said crack spaced from said first series of overlapping blind holes, fixedly securing a lock in each of said first and second series of overlapping blind holes, providing a plurality of overlapping tapered bolts in said wall along said crack between said locks, thereby pre-stressing said locks and filling the gap of said crack, and removing any portion of said bolts which extends beyond the surface of said wall.

4. A method of repairing cracked or fractured metal parts in accordance with claim 3 wherein said step of providing a plurality of overlapping bolts is performed in such a manner so that some of said bolts also overlap a portion of the locks.

5. The method of repairing cracked or fractured metal parts in accordance with claim 3 wherein said tapered bolts are provided with a weakened portion intermediate their length, and said step of providing a plurality of overlapping tapered bolts includes the application of a turning torque to said bolts of sufficient strength so as to shear said bolts at said weakened portion.

References Cited in the file of this patent

UNITED STATES PATENTS

| | | |
|---|---|---|
| 2,111,357 | Cornell | Mar. 15, 1938 |
| 2,198,167 | Harman | Apr. 23, 1940 |
| 2,286,809 | Hutchison | June 16, 1942 |
| 2,291,162 | Kirby | July 28, 1942 |